United States Patent
Deyerler

(10) Patent No.: US 7,086,120 B2
(45) Date of Patent: Aug. 8, 2006

(54) CASTER FOR SHOPPING AND TRANSPORT TROLLEYS

(75) Inventor: Kurt Deyerler, Illertissen (DE)

(73) Assignee: Wanzl Metallwarenfabrik GmbH, Leipheim (DE)

( * ) Notice: Subject to any disclaimer, the term of this patent is extended or adjusted under 35 U.S.C. 154(b) by 43 days.

(21) Appl. No.: 10/879,051

(22) Filed: Jun. 30, 2004

(65) Prior Publication Data
US 2004/0231098 A1 Nov. 25, 2004

Related U.S. Application Data

(63) Continuation-in-part of application No. PCT/DE2002/003838, filed on Oct. 11, 2002.

(30) Foreign Application Priority Data
Jul. 4, 2002 (DE) .............................. 102 29 931

(51) Int. Cl.
*B60B 33/00* (2006.01)
(52) U.S. Cl. .......................... 16/35 R; 16/31 R; 16/47
(58) Field of Classification Search ............... 16/35 R, 16/18 CG, 47, 48; 301/5.309, 8, 13.1, 13.2, 301/36.1; 198/866; 188/1.12, 26, 32
See application file for complete search history.

(56) References Cited

U.S. PATENT DOCUMENTS

| 1,563,152 A | * | 11/1925 | Bowen ........................ 16/41 |
| 1,780,761 A | * | 11/1930 | Naschke, Jr. .................. 16/46 |
| 3,305,064 A | * | 2/1967 | Mullis et al. ................. 198/321 |
| 3,608,693 A | * | 9/1971 | Stosberg et al. ............. 198/866 |
| 3,751,757 A | * | 8/1973 | Stosberg et al. ............. 16/35 R |
| 3,892,295 A | * | 7/1975 | Hahto ......................... 188/111 |
| 3,914,821 A | * | 10/1975 | Screen ........................ 16/35 R |
| 4,250,593 A | * | 2/1981 | Sachser ....................... 16/45 |
| 5,787,547 A | * | 8/1998 | Joseph et al. ................ 16/35 R |

FOREIGN PATENT DOCUMENTS

| DE | 2937572 A | * | 4/1981 |
| DE | 3214983 A | * | 10/1983 |
| DE | 3841697 A | * | 6/1990 |
| DE | 4010918 A1 | * | 1/1991 |
| DE | 295 18 629 | | 1/1996 |
| DE | 296 19 734 | | 1/1997 |
| FR | 2 373 405 | | 7/1978 |
| GB | 2147377 A | * | 5/1985 |
| JP | 06064404 A | * | 3/1994 |
| WO | 96 17733 | | 6/1996 |

* cited by examiner

*Primary Examiner*—Chuck Y. Mah
(74) *Attorney, Agent, or Firm*—Buchanan Ingersoll PC

(57) ABSTRACT

A caster for shopping and transport trolleys which are suitable for conveyance on travelators, includes a wheel fork provided with fork arms and carrying an axle body having a round cross-section and extending through a hub which is arranged between the fork arms and on which two running wheels are mounted, the hub having a crosspiece arranged between the running wheels and the outer contour of the crosspiece having a cylindrical or other geometrically uniform shape, and comprising at least one supporting means arranged on at least one of the two fork arms and intended to support the caster when its running wheels are located in the grooves—separated by bridge pieces—of the conveyor belt of a travelator, wherein, measured from the floor, the lowermost boundary of the crosspiece of the hub is arranged higher than the contact surface of the at least one supporting means.

3 Claims, 1 Drawing Sheet

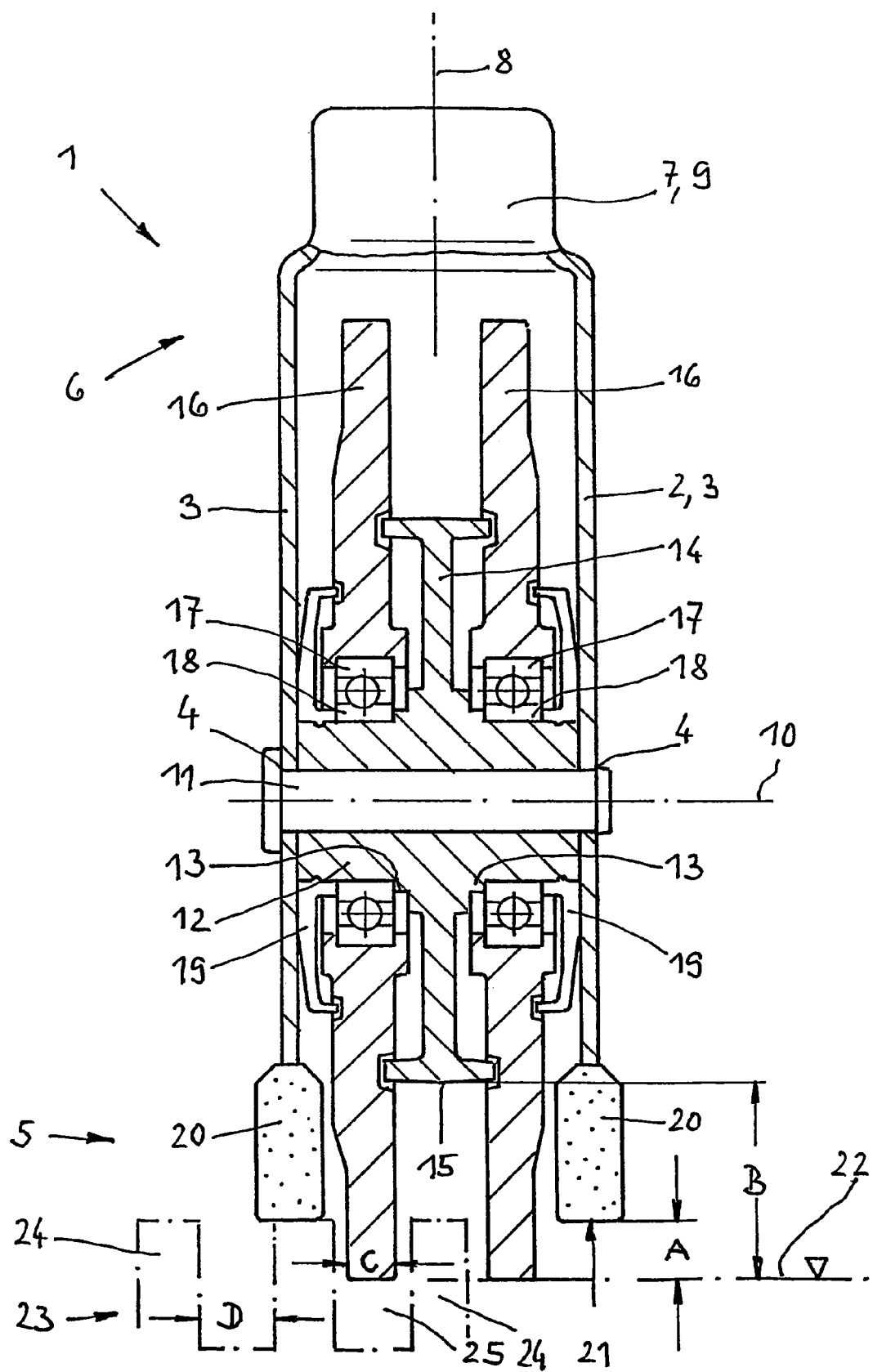

CASTER FOR SHOPPING AND TRANSPORT TROLLEYS

CROSS REFERENCE TO RELATED APPLICATIONS

The present application is a continuation-in-part of PCT/DE 2002/003838, filed on Oct. 11, 2002, and which claims the priority of DE 102 29 931.5, filed on Jul. 4, 2002. The contents of PCT/DE 2002/003838 and DE 102 29 931.5 are hereby incorporated herein by reference.

BACKGROUND OF THE APPLICATION

1. Field of the Invention

The invention relates to a caster for shopping and transport trolleys which are suitable for conveyance on travelators.

2. Description of Related Art

A caster of this type has been developed by the applicant under the designation "type III travelator caster". This caster has a wheel fork provided with fork arms and carrying an axle body formed from square bar steel and extending through a hub arranged between the fork arms. Two running wheels intended for rolling along the floor are rotatably mounted on the hub, which has a circumferential crosspiece arranged between the two running wheels. The crosspiece is downwardly extended and forms a mounting for receiving a supporting means on which the caster is supported in a known manner when its running wheels are located in the grooves of the conveyor belt of a travelator. The supporting forces are transmitted via the hub to the axle body and from there to the wheel fork. The hub therefore has to be precisely positioned between the fork arms and secured against rotation so that the supporting means always points downwards. Rotational security is achieved by the use of the axle body formed from square bar steel. The axle body is therefore mounted in square openings in the fork arms. The hub likewise has an opening of square cross-section for receiving the axle body.

The endeavour is to keep the production costs for casters of this type as low as possible. These costs also include the assembly costs which are applicable when the individual components are assembled into finished casters. It therefore suggests itself to automate assembly processes of the type just described. In the present caster, such processes are relatively hard to achieve because the hub has to be inserted in a precise position between the fork arms owing to the downwardly extended mounting and also the square opening for receiving the axle body. Consequently, both the axle body manufactured from square bar steel and the above-described hub are unsuitable for automatic assembly.

German utility model DE 295 18 629 U1 also describes a caster for shopping and transport trolleys which are intended for conveyance on travelators. Two hub halves, on which two casters are rotatably mounted, are arranged between the fork arms of the wheel fork of this caster. A screw secured by a nut is provided as an axle body and extends through the two hub halves and the fork arms. A supporting foot is arranged on the outside of one of the two fork arms. The supporting foot carries a supporting means which has the same function as described in relation to the aforementioned caster.

The running wheels of the two casters just described, which form part of the prior art, are arranged at a mutual distance such that shopping and transport trolleys fitted with these casters are conveyable on travelators which conform at least to European standard EN 115. The running wheels of the casters extend into the grooves of the moving travelator belt so that the supporting means of the casters rest on the bridge pieces forming the grooves and the shopping and transport trolleys are maintained stationary on the travelator.

Owing to different methods of construction of the travelators, two difference distance measurements (spacings) for the aforementioned grooves have to be taken into consideration. A first spacing is 8.5 mm, the second spacing is 9 mm. This situation led in the past to the development of two types of caster in which the distance between the running wheels (gauge) was adapted to the two different spacings of the grooves. In a first type of caster the gauge formed by the running wheels is 25.5 mm (3×8.5 mm), and in the second type of caster it is 27 mm (3×9 mm). Different casters for the same purpose have to be stored separately and increase the risk of being mixed up or confused when the casters are replaced for repair purposes.

OBJECTS AND SUMMARY

An object of the invention is to develop further a caster of the initially described type so that automatic assembly of the individual caster parts is better and more quick than hitherto. The functionality of the caster must not be detrimentally affected by this.

According to a further development of the invention and building on the solution to be found, it should also be possible to use one and the same caster on travelators with groove spacing of 8.5 mm or 9 mm.

In an embodiment of the present invention, the hub no longer has, to receive the supporting means. In this way, it is possible to impart to the hub a uniformly geometric, preferably cylindrical shape, which substantially facilitates automatic assembly. Attention does not have to be paid to a precisely fitting arrangement of the supporting means and a square axle body. The axle body also has a cylindrical cross-section, which is advantageous from the point of view of manufacture and assembly. Furthermore, in contrast to the two above-mentioned hub halves, only one single hub is necessary. A single hub can be automatically mounted better and more quickly than two hub halves. When supporting the caster on a travelator with the aid of the at least one supporting means, the newly configured hub proves to be neither troublesome nor an impediment because the lower boundary of the hub advantageously ends above the contact surface of the supporting means. The functionality of the caster is thereby ensured.

If the crosspiece of the hub is kept very narrow, the caster can be configured so that, when the caster is placed on a travelator, the two running wheels either extend into two directly adjacent grooves of the conveyor belt, or two bridge pieces and one groove of the conveyor belt are arranged between the two running wheels. As the width of the running wheels is smaller than the width of the grooves, the axial distance between the two running wheels can be selected so that the caster is usable on travelators in which the spacing of the grooves is either 8.5 mm or 9 mm. In this way, the two different types of caster initially described can be avoided.

BRIEF DESCRIPTION OF THE DRAWINGS

The invention will be further described with reference to an embodiment shown in the drawing.

FIG. 1 illustrates a preferred embodiment of a caster according to the present invention.

DETAILED DESCRIPTION OF THE PREFERRED EMBODIMENTS

The caster 1, shown predominantly in section, is intended for shopping and transport trolleys which are suitable for conveyance on travelators. These casters 1 have an automatic braking effect when a shopping or transport trolley is located on the conveyor belt 23 of a travelator. The caster 1 has a wheel fork 2 provided with fork arms 3 and having, in its upper region 6, a housing-type formation 7, into which is inserted a grooved ball bearing 9 rotatable about a vertical axis 8. A caster 1 of this type is also referred to as a steering caster. However, the present caster 1 can also be provided without a grooved ball bearing 9. Without the ball bearing 9, the caster 1 cannot swivel about a vertical axis 8. Casters 1 of this type are usually referred to as fixed casters. All the technical features described in the following are common to both of these types of casters 1.

A hub 12 is arranged between the two fork arms 3 and is carried by an axle body 11 arranged on a horizontal axis 10. The axle body 11 is supported in an opening 4 in each fork arm 3 and is secured against axial displacement. The axle body 11 is bolt-shaped and has a round, i.e., cylindrical cross-section. Two cylindrical running wheels 16 are arranged on the hub 12 and are mounted on the hub 12 so as to be rotatable about the horizontal axis 10. In the example, each running wheel 16 is provided with a grooved ball bearing 17. Each grooved ball bearing 17 is axially supported by its inner raceway 18 on an annular shoulder 13 provided on the hub 12. The running wheels 16 are clamped to the shoulders 13 via the inner raceways 18 of their grooved ball bearings 17 by further securing means 19, such as "anti-thread plates", so that the running wheels 16 are no longer movable in the axial direction.

The hub 12 has a crosspiece 14 which is arranged between the two running wheels 16 and the outer contour of which has a cylindrical or other geometrically uniform shape, for example that of a dodecagon. The outer diameter or the thickness of the crosspiece 14 is greater than the outer diameter of the remaining cylindrical surface portions of the hub 12; see drawing. In the example, the crosspiece 14 exercises an anti-thread function in respect of the two running wheels 16, i.e., the crosspiece 14 is capable of keeping threads and the like on the floor 22 away from the grooved ball bearings 17 of the running wheels 16. The two fork arms 3 are extended downwards beyond the horizontal axis 10 and, at each fork end 5, carry a support 20 intended to support the caster 1 when its running wheels 16 are located in the grooves 25 of a conveyor belt 23 of a travelator. This situation is shown on the left-hand side of the drawing. Two bridge pieces 24 and two grooves 25 of a conveyor belt 23 are shown. On the right-hand side of the drawing is shown the floor 22 along which the running wheels 16 of the caster 1 roll when a shopping or transport trolley is moved across the floor 22. Measurement A shows the distance between the floor 22 and the contact surface 21 of the support 20 in comparison with the distance B measured between the floor 22 and the lowermost boundary 15 of the crosspiece 14. The lowermost boundary 15 of the crosspiece 14 is arranged higher than the contact surface 21 of the at least one support 20.

The drawing shows the caster 1 which, on the basis of the supplementary object, can be regarded as a preferred embodiment. The crosspiece 14 of the hub 12 is kept so narrow that only a single bridge piece 24 of the conveyor belt 23 of the travelator is situated between the two running wheels 16; Accordingly, the running wheels 16 are each arranged in grooves 25 separated only by the aforementioned bridge piece 24. The caster 1 thus formed can easily overcome the different spacings—8.5 mm and 9 mm—of the grooves 25. The same also applies to a caster 1 with running wheels 16 which are spaced so far apart that, when the caster 1 is placed on the conveyor belt 23 of a travelator, two bridge pieces 24 (or one groove 25) are arranged between the two running wheels 16. In practice, the thickness C of each running wheel is approximately 4.4 mm, whereas the width D of the grooves 25 is set at approximately 6 mm to 6.75 mm. The tolerance ranges created by the given measurements therefore permit the use of one and the same caster 1 on the two different travelators.

Although only preferred embodiments are specifically illustrated and described herein, it will be appreciated that many modifications and variations of the present invention are possible in light of the above teachings and with the purview of the appended claims without departing from the spirit and intended scope of the invention.

The invention claimed is:

1. A caster for shopping and transport trolleys which are suitable for conveyance on travelators, the caster comprising:
   a wheel fork provided with fork arms;
   a hub arranged between the fork arms;
   an axle body having a round cross-section and extending through the hub so that the axle body is carried by the fork arms;
   two running wheels mounted on the hub;
   the hub having a crosspiece arranged between the running wheels and the outer contour of the crosspiece having a geometrical shape;
   at least one support arranged on at least one of the two fork arms and adapted to support the caster when the running wheels are located respectively in grooves separated by bridge pieces of a conveyor belt of a travelator;
   wherein, a lowermost boundary of the crosspiece of the hub is arranged higher than a contact surface of the at least one support.

2. The caster according to claim 1, wherein the distance between the two running wheels is selected so that, when the caster is placed on the conveyor belt of the travelator, the running wheels are arranged in directly adjacent grooves separated by only one bridge piece.

3. The caster according to claim 1, wherein the distance between the two running wheels is selected so that, when the caster is placed on the conveyor belt of the travelator, the running wheels are arranged in grooves separated by two bridge pieces.

* * * * *